W. B. OLIVER.
AMPLIFYING CASE FOR MICROTELEPHONES.
APPLICATION FILED SEPT. 30, 1910.
1,078,746.
Patented Nov. 18, 1913.
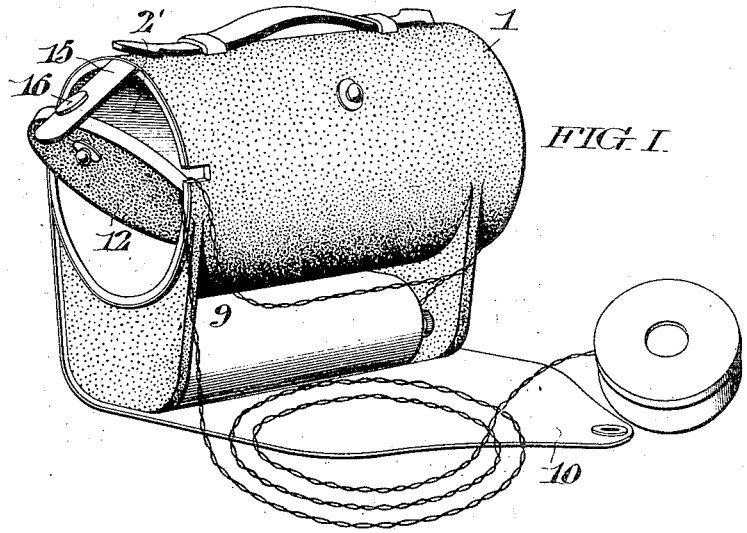
FIG. I.
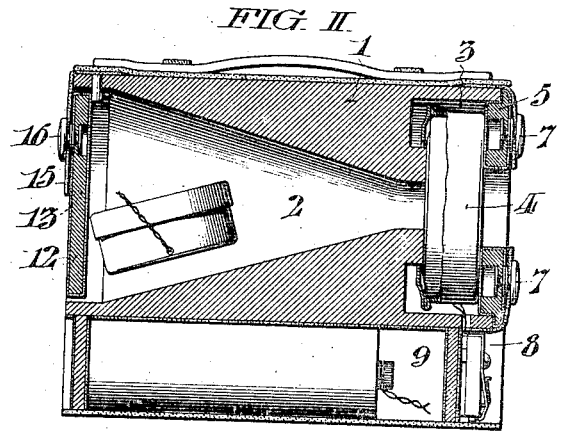
FIG. II.
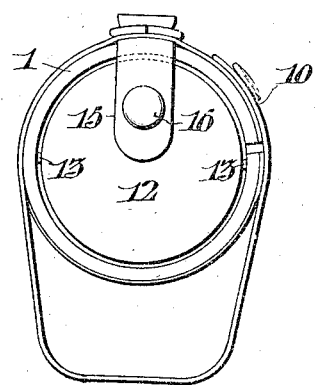
FIG. III.
Witnesses
John C. Bergner
James H. Bell
Inventor
William B. Oliver,
By Foley & Paul
Attorneys

UNITED STATES PATENT OFFICE.

WILLIAM B. OLIVER, OF COLLINGSWOOD, NEW JERSEY.

AMPLIFYING-CASE FOR MICROTELEPHONES.

1,078,746.  Specification of Letters Patent.  Patented Nov. 18, 1913.

Application filed September 30, 1910. Serial No. 584,633.

*To all whom it may concern:*

Be it known that I, WILLIAM B. OLIVER, of Collingswood, in the county of Camden and State of New Jersey, have invented certain new and useful Improvements in Amplifying-Cases for Microtelephones, whereof the following is a specification, reference being had to the accompanying drawings.

My improvements relate to portable cases for microtelephones, as for instance, those used to assist the hearing of the deaf. By my invention, I provide such a portable case, which not only securely holds and protects all of the elements of the microtelephone, but also includes an amplifying chamber, which may be employed when desired in connection with the transmitter. At the same time all parts of the instrument may be removed from the case and used independently thereof.

Heretofore it has been usual to provide microtelephones for conversational use, in which the transmitter is capable of being attached to the person, the battery placed within the pocket and the receiver held by the hand to the ears, all with proper wiring connections. It has likewise been usual to provide for use in public assemblies an entirely separate instrument with the parts permanently placed in a case and with an amplifying chamber formed in the case always in proper relation to the transmitter. My present invention makes it unnecessary to possess two separate instruments for these two uses, because the same working parts are by my invention made capable of use under both conditions, that is either for conversational or for auditorium purposes.

In a convenient embodiment of my invention, the amplifying chamber is provided with a closure in the form of a swiveled shutter, whereby the chamber may at times be used as a closed receptacle for any part of the telephone, as for instance, the receiver, with the additional function when the amplifying chamber is in use, of providing a ready means for controlling the volume of sound reaching the transmitter by adjustment of the swinging shutter at its mouth. In other respects my case provides a neat and simple means for securely protecting and easily carrying the elements of a microtelephone.

In the accompanying drawings, Figure I, is a perspective view of an amplifying case, embodying my invention, the case being partially opened to expose the battery chamber. Fig. II, is a longitudinal vertical section of the same, with the receiver shown within the amplifying case, where it is ordinarily carried. Fig. III, is an end elevation of the case seen in Fig. II.

My amplifying case comprises a receptacle 1, generally cylindrical in shape, within which is formed the conical amplifying chamber 2. In the region of the small end of the amplifying chamber, there is formed an auxiliary chamber 3, of suitable size and shape to conveniently receive the transmitter 4, which when packed within this chamber occupies a proper position, with relation to the amplifying chamber to receive and transmit the amplified sound waves passing therethrough. This auxiliary chamber for the transmitter is closed by a suitable lid 5, preferably annular in shape, leaving a central sound receiving aperture, and which may be conveniently held in place by fastening devices 7, 7, as shown. Thus the chamber and its lid are so arranged that the transmitter may be easily and quickly removed from the case, and the whole instrument put into use independently thereof.

Below the parts thus described are additional receptacles 8, and 9, in the former of which may be placed the hand switch, and in the latter, the battery elements of the microtelephone. This latter receptacle is closed by the flap 10, suitable openings or slits being provided to permit the cords of the microtelephone to pass from compartment to compartment.

The flaring end of the amplifying compartment is closed and protected by a swinging shutter 12, which is swiveled centrally upon pivots 13, 13. In its closed position, it is held in place by a flap 15, with a fastener 16, in which condition the amplifying chamber affords a convenient receptacle for the receiver of the microtelephone, but when used as an amplifying chamber, the receiver having been removed and the swinging shutter unloosed from its fastening, the shutter operates as a regulating shutter, increasing or decreasing the aperture of the amplifying chamber according to the angle at which it rests. This is an important consideration, as under certain conditions of use, an amplifying chamber, such as I have shown, may cause the sound to be magnified to a disagreeable extent, unless its function is regulated and modified by the means which I have described.

When used as a portable case, the parts of the microtelephone rest within it, in substantially the position shown in Fig. II. For conditions of ordinary usage, where no amplification of the sound is required, all of the parts of the microtelephone are immediately removable from the case, and may be used in any convenient manner. It will be noted in removing the parts of the microtelephone entirely from the case, there is no disturbance of the electrical connections or other interference with their functions. When the elements of the microtelephone are desired to be used in connection with the amplifying chamber, the battery and transmitter remain in place, only the receiver being removed from the case, and applied to the ear. In this condition the case may be held in the lap or stood upon a table, with the amplifying chamber in proper relation to the traveling sound waves, the entrance of which is then subject to regulation by manipulation of the shutter as described.

Having thus described my invention, I claim:—

1. A microtelephone provided with a case containing receptacles for the functional parts of the microtelephone including a special receptacle for the transmitter, and an amplifying chamber in such position in the case that the transmitter when inserted in its receptacle is in proper coincidence with the amplifying chamber; electrical connections between said functional parts; and means whereby all such functional parts are removable from said case without disturbance of their electric connections or functions.

2. In a portable microtelephone, the combination with a receptacle fitted with a transmitter and an amplifying chamber; a shutter fitted within, but large enough to completely close the mouth of the amplifying chamber, said shutter being pivoted within the amplifying chamber on a transverse axis, whereby said shutter may be adjusted when opened to vary the aperture and to regulate the extent to which the amplifying chamber magnifies the sound waves.

In testimony whereof, I have hereunto signed my name at Philadelphia, Pennsylvania, this twenty-seventh day of September, 1910.

WILLIAM B. OLIVER.

Witnesses:
JAMES H. BELL,
E. L. FULLERTON.